L. A. CLAYTON.
COMBINED INCUBATOR AND BROODER.
APPLICATION FILED NOV. 11, 1911.

1,051,988.

Patented Feb. 4, 1913.
4 SHEETS—SHEET 1.

Witnesses
W. S. McDowell.
V. B. Hillyard.

Inventor
Lee Ander Clayton
By Victor J. Evans
Attorney

L. A. CLAYTON.
COMBINED INCUBATOR AND BROODER.
APPLICATION FILED NOV. 11, 1911.

1,051,988.

Patented Feb. 4, 1913.
4 SHEETS—SHEET 3.

Witnesses

Inventor
Lee Ander Clayton.
By Victor J. Evans
Attorney

L. A. CLAYTON.
COMBINED INCUBATOR AND BROODER.
APPLICATION FILED NOV. 11, 1911.
1,051,988.
Patented Feb. 4, 1913.
4 SHEETS—SHEET 4.
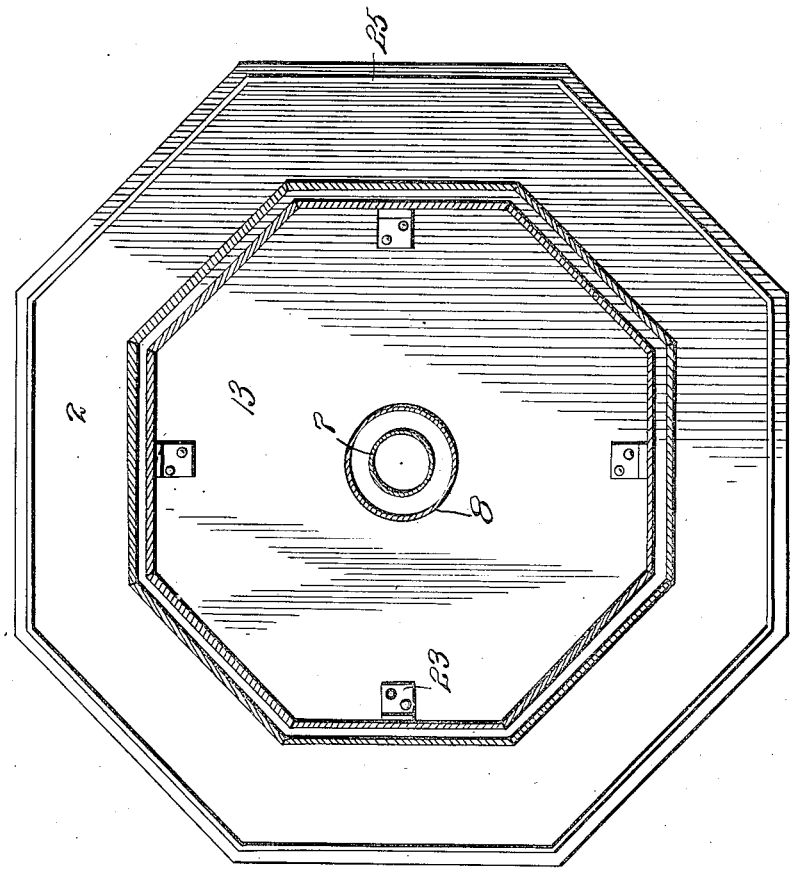
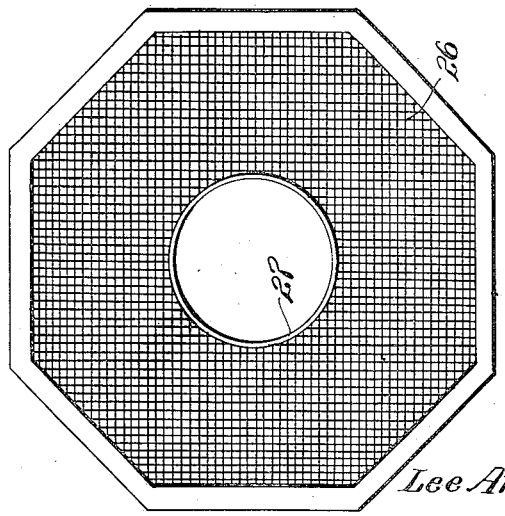
Witnesses
W. S. McDowell.
U. B. Hillyard.
Inventor
Lee Ander Clayton
By Victor J. Evans
Attorney

UNITED STATES PATENT OFFICE.

LEE ANDER CLAYTON, OF COTTONDALE, ALABAMA.

COMBINED INCUBATOR AND BROODER.

1,051,988.      Specification of Letters Patent.      Patented Feb. 4, 1913.

Application filed November 11, 1911. Serial No. 659,759.

*To all whom it may concern:*

Be it known that I, LEE ANDER CLAYTON, a citizen of the United States, residing at Cottondale, in the county of Tuscaloosa and State of Alabama, have invented new and useful Improvements in Combined Incubators and Brooders, of which the following is a specification.

This invention provides a device of the character stated which admits of a continuous circulation of fresh air which is heated in its passage to the egg chamber, thereby preventing any possible chilling of the eggs, the air after leaving the egg chamber passing through the brood chamber, thence into a space surrounding and adjacent the brood chamber in which the chicks are free to exercise and feed.

The invention provides a structure admitting of the egg chamber being removed from the brood chamber both for purposes of ventilation and to permit of the eggs being turned, the arrangement also providing for easy access to the interior of the structure for any purpose whatsoever.

The invention also aims to provide a structure in which the chicks when hatched may pass into the brood chamber and after all the eggs of a setting have been hatched and during the period of brooding a new setting may be placed for hatching, the object being to practically admit of a continuous operation, the brood from one setting of eggs maturing while the other set of eggs is hatched.

The invention consists of the novel features, details of construction and combination of parts, which hereinafter will be more particularly set forth, illustrated in the accompanying drawings, and pointed out in the appended claim.

Figure 1:
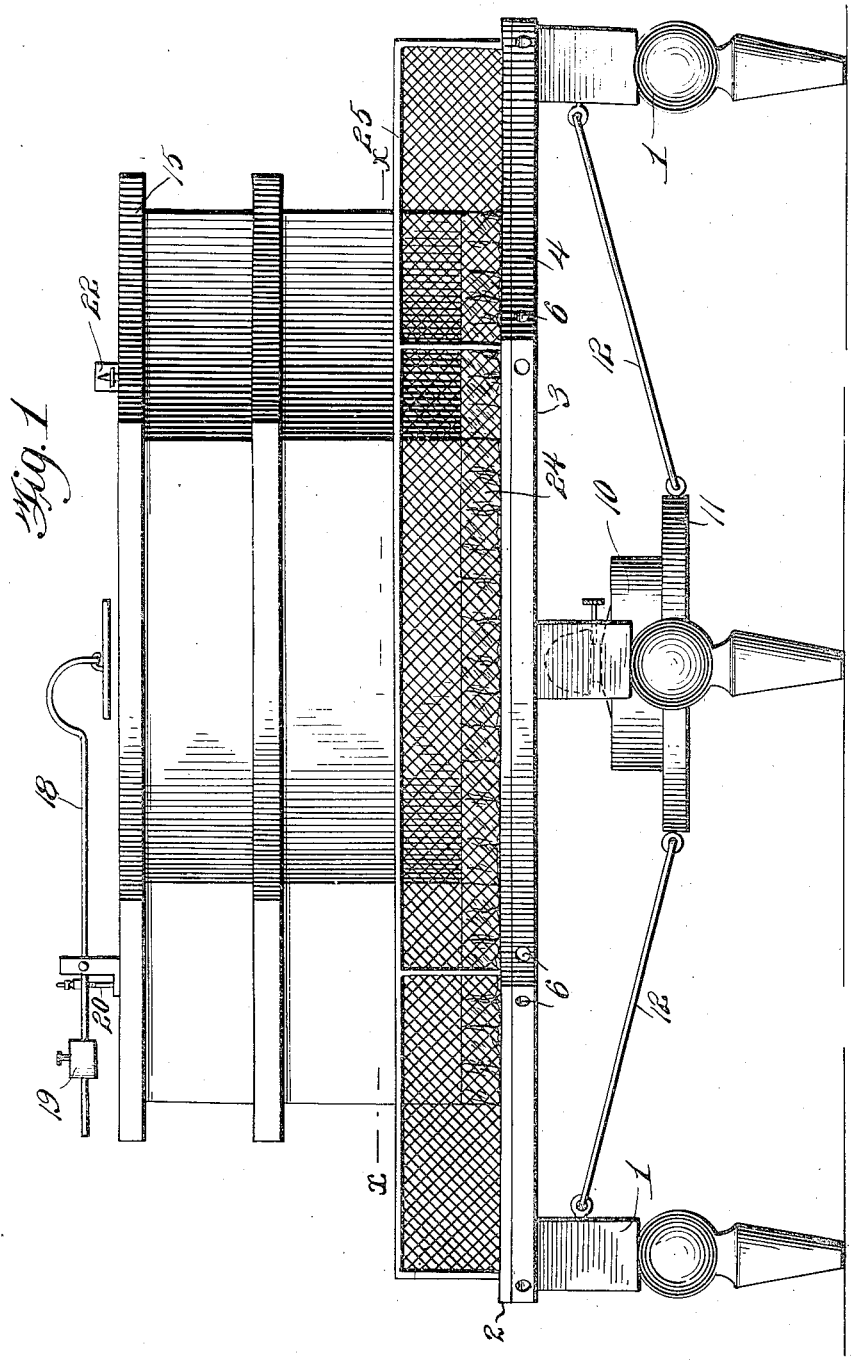
Figure 2:
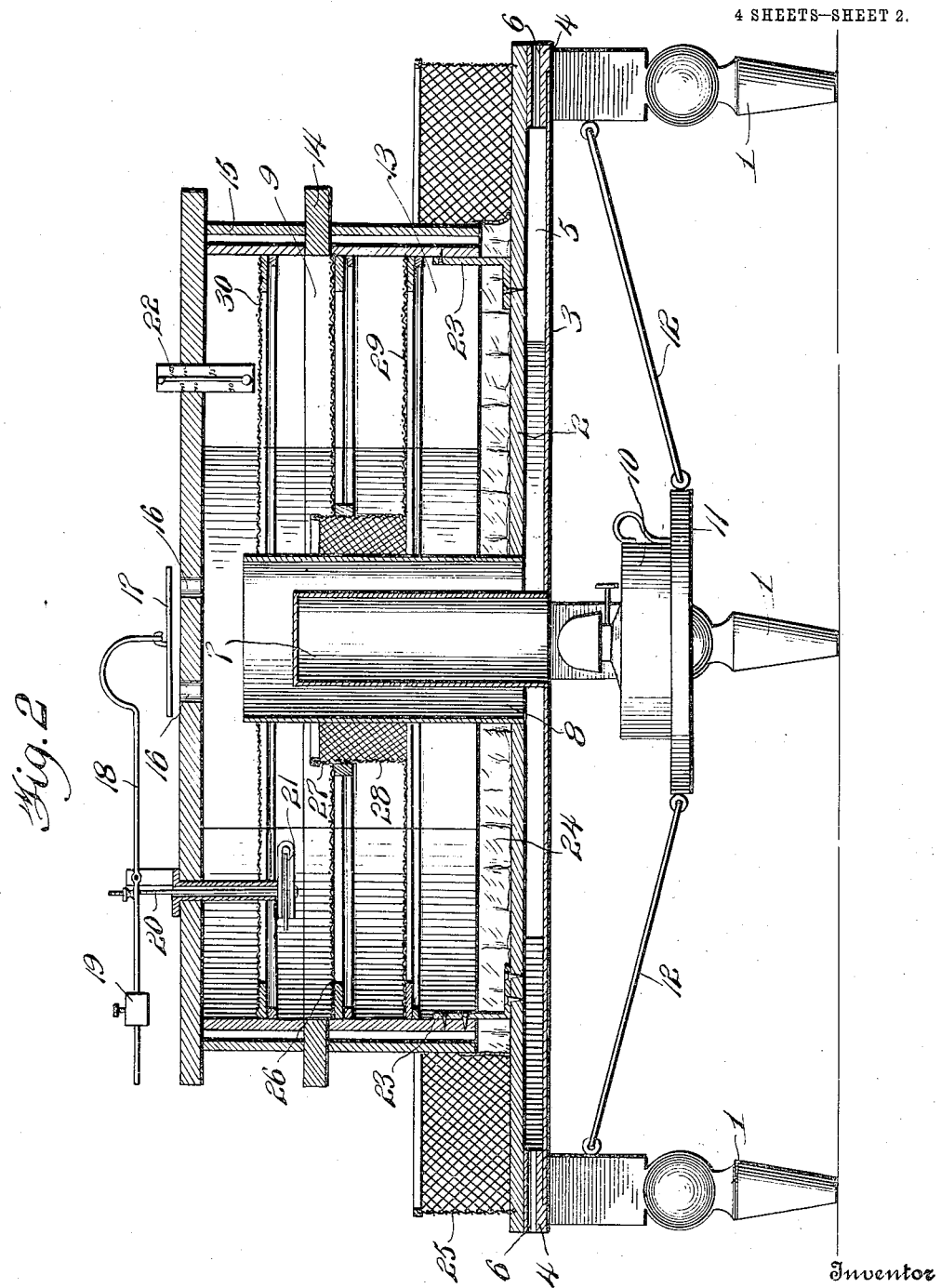
Figure 3:
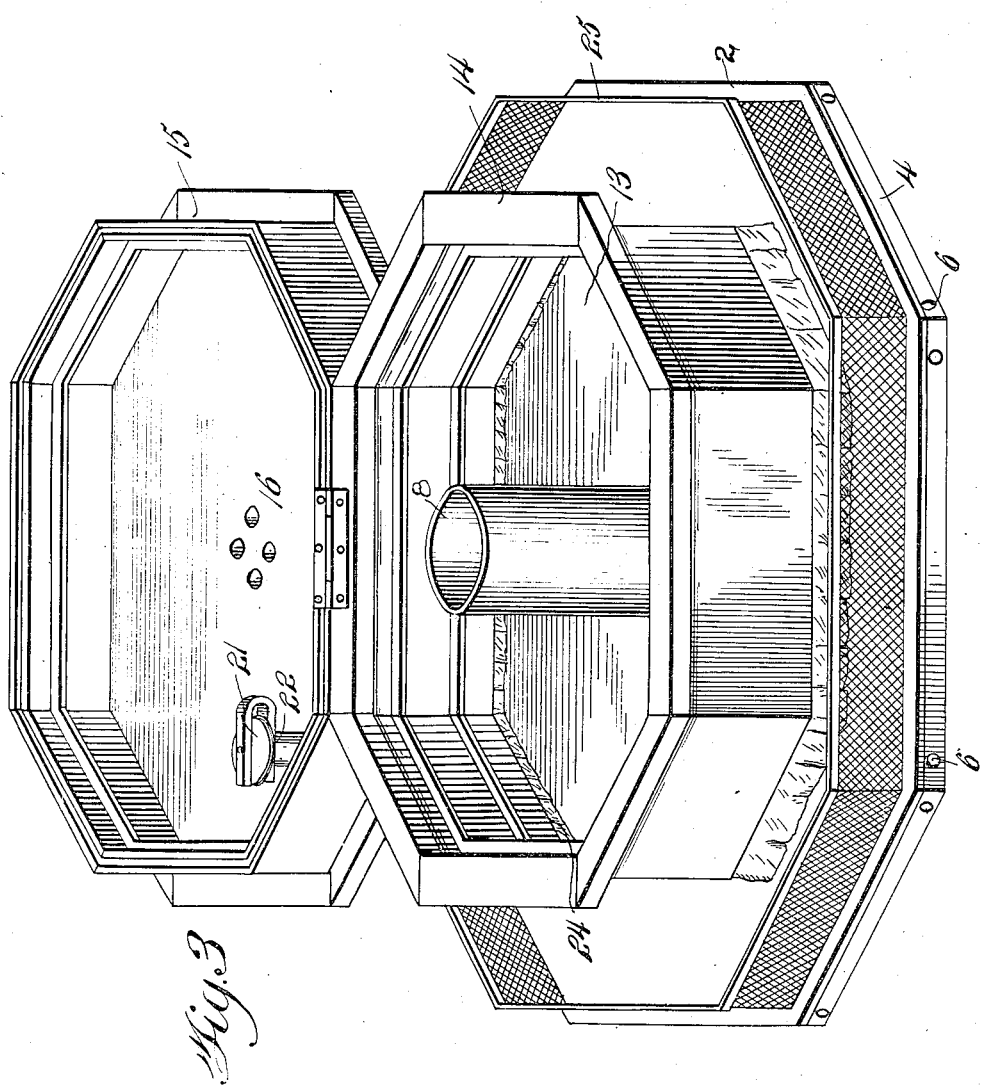

Referring to the drawings, forming a part of the specification, Figure 1 is a side view of a combined incubator and brooder embodying the invention. Fig. 2 is a vertical central section thereof. Fig. 3 is a perspective view, showing the upper portion of the structure forming the egg chamber turned to one side and exposing the interior of the brood chamber. Fig. 4 is a top plan view of the egg tray. Fig. 5 is a horizontal section on the line $x$—$x$ of Fig. 1.

Corresponding and like parts are referred to in the following description, and indicated in all the views of the drawings, by the same reference characters.

The structure is mounted upon a stand embodying legs 1 and a top, the latter consisting of two plates 2 and 3 which are spaced apart, a strip 4 being interposed between the outer edges of the two plates to hold them apart the required distance, thereby maintaining the space 5 between them. The lower plate 3 is preferably of sheet metal, whereas the plate 2 may be of wood or other suitable material. The filling strip 4 has openings 6 formed therein through which air is permitted to freely pass into the space 5. The plates 2 and 3 have openings at a central point, the opening in the plate 3 being of less diameter than the opening in the plate 2. A shell 7 is secured at its lower end to the plate 3 in line with the opening thereof, said shell being preferably of cylindrical form and closed at its upper end. A second shell 8 is secured at its lower end to the plate 2 in line with the opening thereof. An annular space is formed between the two shells 7 and 8, which is in communication at its lower end with the space 5 formed between the two plates 2 and 3 and which is in communication at its upper end with the egg chamber 9. The shell 8 is open at both ends.

A lamp 10 is located below the top of the stand in line with the shell 7 and is placed upon a support 11, which is held in suspension by means of stays 12, which may consist of wire, chains, or rods. Heat from the chamber rises and passes into the shell 7, thereby warming the air passing through the space formed between the two shells 7 and 8.

The superstructure comprises two sections designated as the egg chamber 9 and brood chamber 13. Each of the sections comprises an inner and an outer wall between which is formed a dead air space. The egg chamber 9 is removable from the brood chamber 13, but to prevent displacement of the chambers they are connected by means of a hinge so that the egg chamber may be swung to one side, as indicated in Fig. 3, when it is required to gain access to the interior of the structure for any purpose. A cap piece or strip 14 is secured to the upper edge of the section 13 and closes the space formed between the inner and outer walls thereof and this strip forms a support for the upper section or egg chamber 9. The top 15 is secured to the upper section and closes the structure. Openings 16 are formed in the top 15 to provide an outlet for any surplus heat, thereby preventing overheating of the device when in operation. A damper 17 is located above the openings 16 and is attached to one end of a lever 18, the opposite end of said lever having a weight 19 adjustable thereon. A rod 20 adjustably supports the lever 18 and extends into the egg chamber and is connected at its lower end to a thermostat 21 of any design. After the parts have been set any excess of heat within the structure will cause an expansion of the thermostat and an elevation of the damper, with the result of providing a less obstruction to the outflow of the heated air through the opening 16. Should the temperature within the structure fall below a given point the thermostat will contract in a well known manner and permit the damper 16 to lower and thereby offer a greater obstruction to the outflow of the heated air from the structure, with the result that the temperature will naturally rise. A thermometer 22 is supported within an opening formed in the top 15 and may be removed or raised or lowered to meet existing conditions or any desired requirement. The superstructure is supported upon the stand in a manner to leave a space between its lower edge and the top of the stand. Any means may be provided for sustaining the superstructure and as shown brackets 23 are utilized, the same being secured to the top of the stand and the vertical walls of the superstructure. The top of the stand or the plate 2 constitutes the floor of the brood chamber and the floor of the exercising and feeding space exterior to and surrounding the superstructure. A curtain 24 is pendent from the lower edge of the superstructure 20 and extends across the space formed between said lower edge and the floor or top of the stand. The portion of the top of the stand or the floor of the superstructure exterior to the brood chamber constitutes a gallery where the chicks feed and exercise. A railing 25 incloses said gallery and prevents the chicks falling therefrom. The egg tray 26 is supported at or near the top of the brood chamber 13 and has a centrally disposed opening for the passage of the shell 8, a space being provided between the inner edge of the tray and the shell 8 for the escape of chicks as they hatch, thereby enabling the chicks to pass from the hatching chamber into the brood chamber. The egg tray consists of an inner and an outer frame over which is stretched wire fabric. It is to be understood that the tray 26 may be of any construction usually provided for supporting the eggs in incubators. A guard 27 extends upwardly from the inner edge of the egg tray bordering upon the opening between said edge and the shell 8. A second guard 28 is pendent from the inner edge of the egg tray. A partition 29 is located some distance below the egg tray and is preferably of fabric. A second partition 30 is located above the egg tray and is likewise of fabric. The partition 29 forms the top of the hover and also serves to retard the circulation of warm air. The partition 30 acts as a distributer and serves to equalize the warm air, thereby insuring an equalization of the heat throughout the interior of the structure.

In the operation of the device the eggs to be hatched are placed upon the tray 26, the upper section 9 of the superstructure being swung to one side, as indicated in Fig. 3. After the eggs have been placed upon the tray 26 the section 9 is closed upon the section 13 and the lamp 10 is lighted, the flame being regulated and the damper set so as to secure the proper temperature. Should the temperature fall within the structure from any cause the damper is lowered so as to obstruct the outlets 16 more or less, thereby retaining the heat. Should the temperature rise the damper 17 is lifted, thereby admitting of a freer outlet for the warm air to prevent overheating. The heat and gases from the lamp enter the closed shell 7 and are prevented from passing into the superstructure. The fresh air passing through the opening 6 enters the space 5 and passes upward through the space formed between the shells 7 and 8 and is warmed by the heat radiated from said shell 7. The warm air escaping from the upper end of the shell 8 enters the outer part of the hatching chamber 9 and coming in contact with the partition 30 is spread or distributed and passing through the fine meshes of the fabric comprising said partition continues downward through the egg tray 26 into the brood chamber, thence outward beneath the curtain 24 into the gallery surrounding the brood chamber. The warm air escaping from the brood chamber and passing outwardly insures sufficient warmth to the chicks feeding or exercising on the gallery, thereby preventing chill which would be disastrous. It is noted that there is a constant change of air, since the circulation is continuous, the warm air from the interior of the structure escaping and fresh air being supplied to take the place thereof. By having the plate 3 and the shell 7 of metal all danger from fire is prevented. The lamp support 11 being hung beneath the top of the stand in the manner set forth provides a simple arrangement, which admits of the lamp being easily and quickly placed in position or removed for trimming or filling.

Considered in its entirety the device is simple in construction, easy of manipulation and adapted to be kept clean, ventilated and inspected, the interior being readily accessible by swinging the top section 9 to one side in the manner stated and as indicated in Fig. 3.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A combined incubator and brooder comprising a stand embodying a top and legs, a brood chamber mounted upon the stand and spaced therefrom and having the outer portion of the stand projecting to form a gallery, a railing surrounding said gallery, a curtain pendent from the lower edge of the brood chamber, a hatching chamber movably fitted upon the brood chamber, a heater, means for suspending the heater below the top of the stand, a heat distributer extending upwardly from the top of the stand and comprising spaced concentric shells, the inner shell being closed at its upper end, heat equalizing partitions applied to the brood and heating chambers, the lower partition having an opening to receive the heat distributer, a guard in line with the opening in the partition and surrounding and spaced from the heat distributer, an egg tray fitted to the upper portion of the brood chamber, and a thermostatic heat control fitted to the hatching chamber and movable therewith.

In testimony whereof I affix my signature in presence of two witnesses.

LEE ANDER CLAYTON.

Witnesses:
H. L. BLACK,
D. P. CANNON.